(12) United States Patent
Cui et al.

(10) Patent No.: US 9,774,997 B2
(45) Date of Patent: Sep. 26, 2017

(54) COMMUNICATION MESSAGE PROCESSING METHOD, DEVICE, AND STORAGE MEDIUM

(71) Applicant: Xiaomi Inc., Beijing (CN)

(72) Inventors: Yongbiao Cui, Beijing (CN); Huayijun Liu, Beijing (CN); Tao Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/216,251

(22) Filed: Jul. 21, 2016

(65) Prior Publication Data

US 2017/0094465 A1    Mar. 30, 2017

(30) Foreign Application Priority Data

Sep. 28, 2015 (CN) .......................... 2015 1 0626605

(51) Int. Cl.
*H04W 4/02* (2009.01)
*H04W 4/12* (2009.01)
*H04W 88/02* (2009.01)

(52) U.S. Cl.
CPC .......... *H04W 4/023* (2013.01); *H04W 4/028* (2013.01); *H04W 4/12* (2013.01); *H04W 88/02* (2013.01)

(58) Field of Classification Search
CPC ..... H04W 24/06; H04W 24/02; H04W 4/043; H04W 72/04; H04W 88/02; H04W 4/04; G01C 21/3626; G01C 21/3423; G01C 21/3453; G01C 21/343; H04M 1/72569; H04M 1/72577; H04M 1/72572; A61B 5/6898

USPC .............. 455/414.1, 466, 456.4, 421, 404.2; 709/206, 207; 705/9
See application file for complete search history.

(56) References Cited

U.S. PATENT DOCUMENTS

| | | |
|---|---|---|
| 2011/0010218 A1* | 1/2011 | Gupta .................... G06Q 10/10 705/7.18 |
| 2014/0004889 A1 | 1/2014 | Davis |
| 2014/0194064 A1 | 7/2014 | Murakami |
| 2014/0206321 A1 | 7/2014 | Mohapatra |

(Continued)

FOREIGN PATENT DOCUMENTS

| | | |
|---|---|---|
| CN | 102685670 A | 9/2012 |
| CN | 104751066 A | 7/2015 |
| KR | 20060040981 A | 5/2006 |

OTHER PUBLICATIONS

International Search Report of International Application No. PCT/CN2015/099059, issued by the State Intellectual Property Office of P.R. China as ISA, mailed Jun. 20, 2016 (11 pages).

(Continued)

*Primary Examiner* — Phuoc H Doan
(74) *Attorney, Agent, or Firm* — Finnegan, Henderson, Farabow, Garrett & Dunner LLP

(57) ABSTRACT

A communication message processing method includes acquiring a terminal distance between a terminal and a wearable device, switching the terminal to an auto-reply mode when the terminal distance exceeds a preset distance threshold, and, when a communication application program in the terminal receives a communication message, controlling the communication application program to send an auto-reply message to a sender of the communication message.

13 Claims, 14 Drawing Sheets

(56) References Cited

U.S. PATENT DOCUMENTS

2015/0320588 A1\* 11/2015 Connor ................ A61F 7/0097
607/107
2016/0316419 A1\* 10/2016 Shyamalan ............. H04W 4/02

OTHER PUBLICATIONS

Extended Search Report for European Application No. 16162080.2 from the European Patent Office, dated Feb. 23, 2017.
English version of International Search Report of International Application No. PCT/CN2015/099059, issued by the State Intellectual Property Office of P.R. China as ISA, mailed Jun. 20, 2016.

\* cited by examiner

COMMUNICATION MESSAGE PROCESSING METHOD, DEVICE, AND STORAGE MEDIUM

This application claims the priority of Chinese patent application No. 201510626605.6, filed on Sep. 28, 2015, the entire contents of which are incorporated herein by reference.

TECHNICAL FIELD

The present disclosure relates to computer technologies and, more particularly, to a communication message processing method, device, and storage medium.

BACKGROUND

Mobile terminals are widely used in people's daily life and business activities. People use mobile terminals to make phone calls and to communicate with others using instant messages. However, if a user has forgotten to carry a mobile terminal, the user cannot receive and respond to an instant communication message or a phone call in time. This causes delay in acquiring information.

SUMMARY

In accordance with the present disclosure, there is provided a communication message processing method including acquiring a terminal distance between a terminal and a wearable device, switching the terminal to an auto-reply mode when the terminal distance exceeds a preset distance threshold, and, when a communication application program in the terminal receives a communication message, controlling the communication application program to send an auto-reply message to a sender of the communication message.

Also in accordance with the present disclosure, there is provided a terminal including a processor and a memory storing instructions. The instructions, when executed by the processor, cause the processor to acquire a terminal distance between the terminal and a wearable device and switch the terminal to an auto-reply mode when the terminal distance exceeds a preset distance threshold. When a communication application program in the terminal receives a communication message, the instructions cause the processor to control the communication application program to send an auto-reply message to a sender of the communication message.

Also in accordance with the present disclosure, there is provided a non-transitory computer-readable storage medium having stored therein instructions that, when executed by a processor of a terminal, cause the terminal to acquire a terminal distance between the terminal and a wearable device and switch the terminal to an auto-reply mode when the terminal distance exceeds a preset distance threshold. When a communication application program in the terminal receives a communication message, the instructions cause the mobile terminal to control the communication application program to send an auto-reply message to a sender of the communication message.

In the embodiments of this disclosure, it should be understood that both the foregoing general description and the following detailed description are only exemplary and explanatory and are not restrictive of the invention.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. In the drawings.

Through the above accompany drawings, the specific embodiments of the disclosure have been shown, for which a more detailed description will be given below. These drawings and textual description are not intended to limit the scope of the concept of the disclosure in any manner, but to explain the concept of the disclosure to those skilled in the art through particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the invention as recited in the appended claims.

A communication message processing method consistent with the present disclosure can be implemented in a terminal, which can be a mobile terminal, such as a mobile phone, a tablet computer, or the like. An application program managing a wearable device, also referred to herein as a "management application program," is installed on the terminal. The wearable device can be a smart band, a smart pen, a smart pendant, or the like. The terminal can include a communication component and a positioning component. The communication component is configured to process data transmission associated with a communication message. The positioning component is configured to detect position information of the terminal, and can be a Global Positioning System (GPS) or the like. The terminal can be further equipped with a processor, a memory, a transceiver, and the like. The processor can be configured to process the communication message, and the memory is configured to store data required and/or generated during processing of the communication message. The terminal can be further provided with an input/output device, such as a screen, etc. The screen is configured to display an operation interface of the terminal, or the like, and can be, for example, a touch screen. The wearable device can include a positioning component configured to detect position information of the wearable device and can further include a communication component configured to interact with the terminal. The communication component can be, for example, a Bluetooth component, a Wireless-Fidelity (WiFi) component, or the like. The wearable device can further include a processor, a memory, and other components. In some embodiments, the terminal can be a mobile phone and the wearable device can be a band.

Figure 1:
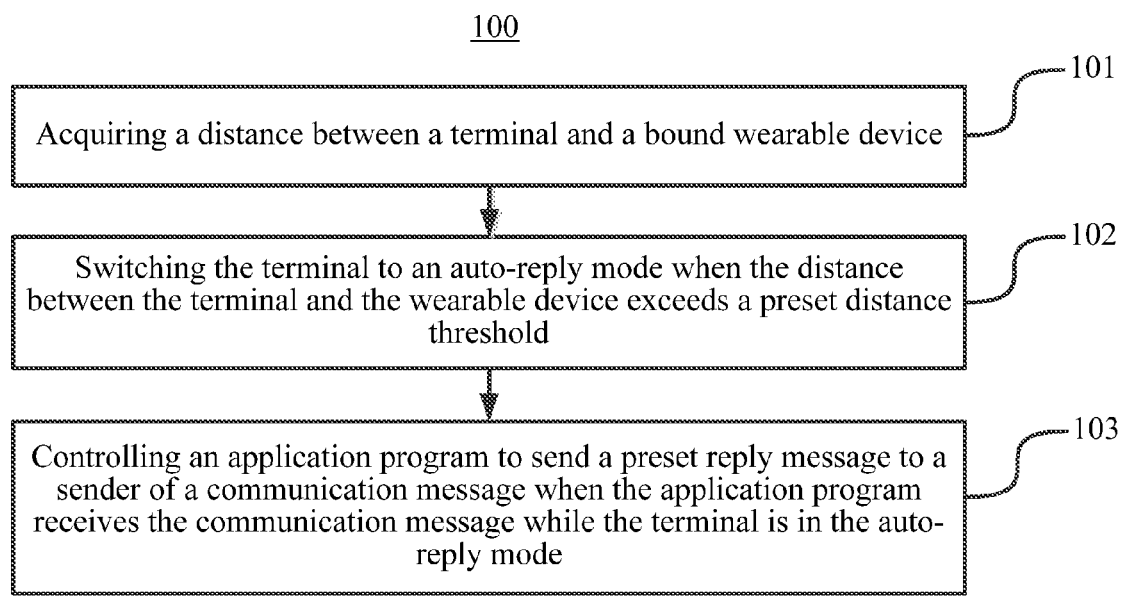
FIG. 1 is a flow chart showing a communication message processing method according to an exemplary embodiment.

FIG. 1 is a flow chart showing a method 100 for processing a communication message according to an exemplary embodiment. As shown in FIG. 1, at 101, a distance between a terminal and a bound wearable device. This distance is also referred to herein as a "terminal distance." In some embodiments, a management application program in the terminal can be used to set the binding between the wearable device and the terminal. After a user binds the terminal with the wearable device, the user can further turn on an auto-reply function in the management application program, which can trigger the terminal to send a distance query request to a server, e.g., a backend server of the management application program. After receiving the distance query request, the server acquires position information of the terminal and the wearable device for every preset period, such as one minute, calculates the distance between the terminal and the wearable device, i.e., the terminal distance, and sends a calculated distance to the terminal.

Figure 2:
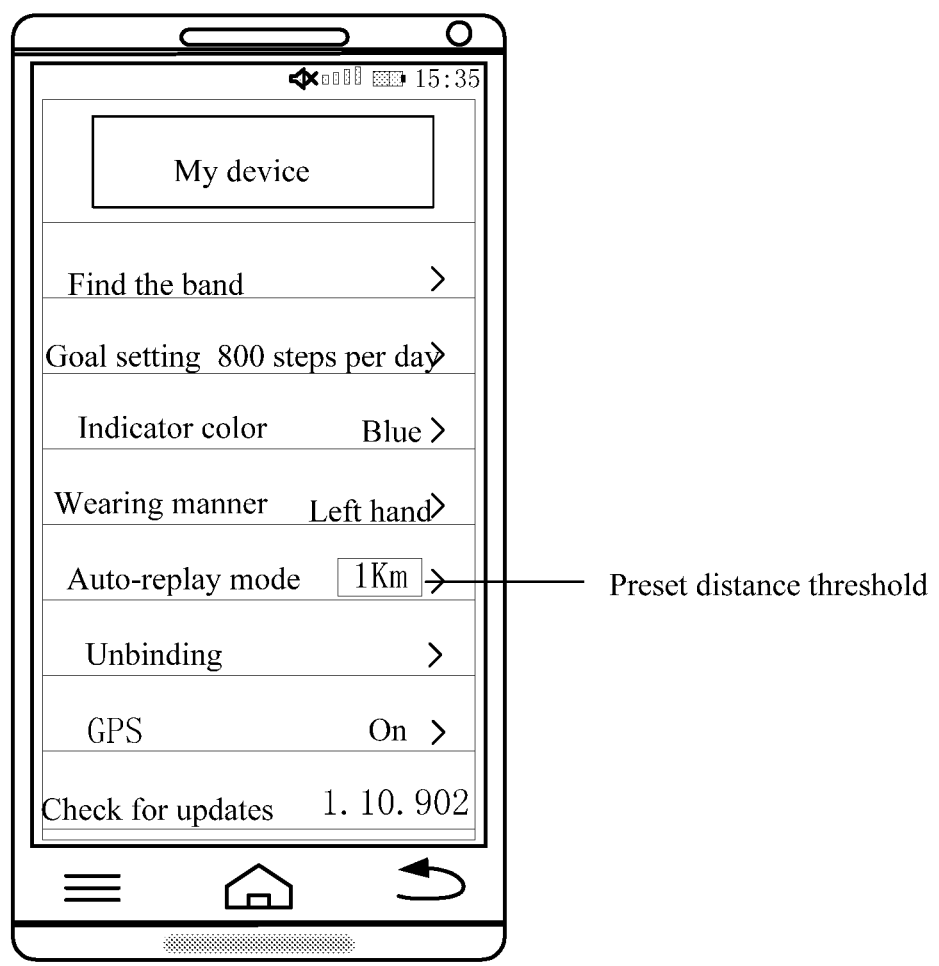
FIG. 2 is a schematic diagram showing operation of a communication message processing interface according to an exemplary embodiment.

At 102, the terminal is switched to an auto-reply mode when the terminal distance exceeds a preset distance threshold. The auto-reply mode can be a profile of the terminal, in which the terminal automatically replies to received messages such as short messages, incoming calls, social application program messages, or the like. In some embodiments, the preset distance threshold can be set in the management application program by the user according to the user's actual needs, such as one kilometer or five kilometers. FIG. 2 schematically shows an exemplary communication message processing interface of the management application program installed on the terminal. In the example shown in FIG. 2, the preset distance threshold is set to one kilometer.

In some embodiments, after the terminal receives the terminal distance, the management application program determines whether the terminal distance is greater than the preset distance threshold. The terminal distance being greater than the preset distance threshold may infer that the user has forgotten to carry the terminal, and a local profile in the terminal can be switched to the auto-reply mode.

In the embodiments discussed above, whether the user forgets to carry the terminal is determined based on whether the terminal distance is greater than the preset distance threshold. In other embodiments, however, whether the user forgets to carry the terminal can be determined based on a continuous time period during which the terminal distance exceeds the preset distance threshold. Correspondingly, the terminal is switched to the auto-reply mode when the continuous time period, during which the terminal distance exceeds the preset distance threshold, reaches a preset duration threshold. The duration threshold can be set in the management application program by the user according to the user's actual needs, or can be preset in the management application program by a technical person. The duration threshold can be set to be, for example, five minutes, 30 minutes, or the like.

In some embodiments, after the terminal receives the terminal distance periodically sent by the server, the management application program compares the terminal distance received each time with the preset distance threshold. If each time in a specified duration, i.e., the preset duration threshold, the terminal distance is greater than the preset distance threshold, it is determined that the user has forgotten to carry the terminal, and a local profile can be switched to the auto-reply mode.

At 103, an application program is controlled to send a preset reply message to a sender of a communication message when the application program receives the communication message while the terminal is in the auto-reply mode. The reply message sent by the application program while the terminal is in the auto-reply mode is also referred to herein as an "auto-reply message." The communication message may be a short message, an incoming call, or the like. The reply message can be one of related messages configured to illustrate that the user forgets to carry the terminal. The related messages can be set in the management application by the user or by a technical staff person.

In some embodiments, if the current profile of the terminal is the auto-reply mode, the management application program can monitor communication message receiving events of application programs in the terminal that have a communication function, such as a short message application program, a telephone application program, an instant messaging application program, etc. Such an application program is also referred to as a "communication application program." When the management application program detects that a communication application program receives a communication message, the management application program can control the communication application program to send a reply message to the sender of the communication message through a pre-stored interface provided by the communication application program. For example, when detecting that the communication program Wechat receives a communication message sent by a contact account, the management application program can control Wechat to send a preset reply message such as "The subscriber forgot to carry the mobile phone. Please contact later." to the contact account. In some embodiments, one single reply message can be set in the management application program. Alternatively, different reply messages can be set according to current position information of the wearable device or current time. In addition, words like "[Automatic reply]" can be added at the beginning or the end of each reply message to indicate that the message is not sent by the user manually.

As mentioned above, reply messages can be sent based on position information. For example, a corresponding relation between position information and reply messages can be pre-stored in the terminal. This corresponding relation is also referred to herein as a "position-message corresponding relation." When the communication application program receives a communication message while the terminal is in the auto-reply mode, a reply message corresponding to a current position of the wearable device is determined according to the pre-stored position-message corresponding relation. The communication application program is then controlled to send the determined reply message to the sender of the received communication message.

In some embodiments, a table of position-message corresponding relation, such as Table 1, can be stored in the management application program. Such a table is also referred to herein as a "position-message corresponding table." The position information can be place names. For example, the user can click on a map to input place names, and edit corresponding reply messages. Alternatively, the user can select corresponding reply messages from reply messages preset by the technical staff person. In the position-message corresponding table, the user can add his/her common position information and corresponding reply messages. For example, the name of the user's work place is "Zhongguan Building," and a corresponding reply message can be "The subscriber is at work and has forgotten to carry the mobile phone. Please contact later" or "The subscriber is at work and has forgotten to carry the mobile phone. Please call XXXXXX." A corresponding reply message for "XX cinema" can be "The subscriber is watching a movie. Please contact later." A corresponding reply message for "XX supermarket" can be "The subscriber is in the supermarket. Please contact later." Thus, when the management application program detects that the communication application program receives a communication message while the terminal is in the auto-reply mode, a current position name in current position information of the wearable device can be acquired, a position name in the position-message corresponding table that matches the current position name of the wearable device is found, and then a reply message corresponding to the position name is determined. The communication application program is then controlled to send the determined reply message to the sender of the communication message through a pre-stored interface provided by the communication application program.

TABLE 1

| | Position information | | |
|---|---|---|---|
| | Cinema | Zhongguan Building | Supermarket | ... |
| Reply message | The subscriber is watching a movie. Please contact later. | The subscriber is at work and has forgotten to carry the mobile phone. Please contact later. | The subscriber is in the supermarket. Please contact later. | ... |

Figure 3A:
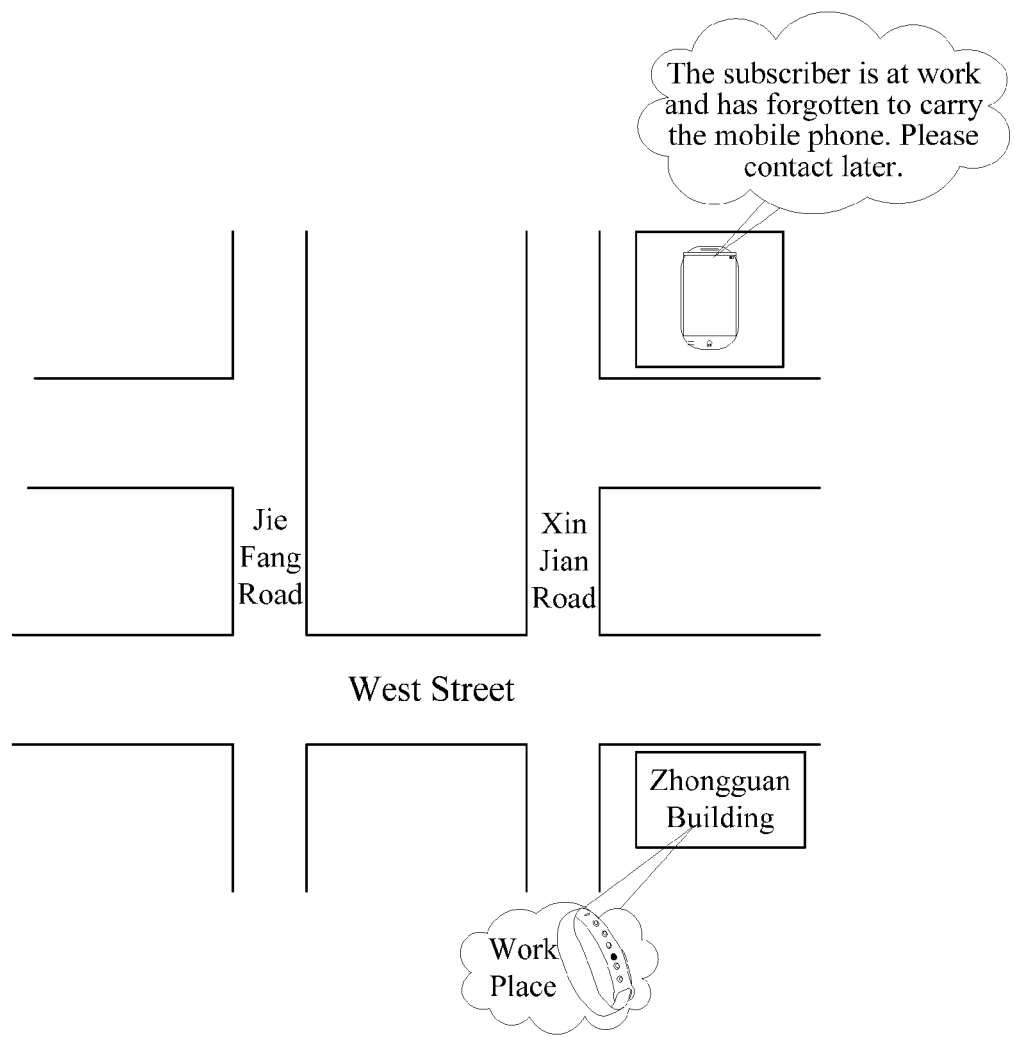
FIG. 3a is a schematic diagram illustrating an application scene according to an exemplary embodiment.
Figure 3B:
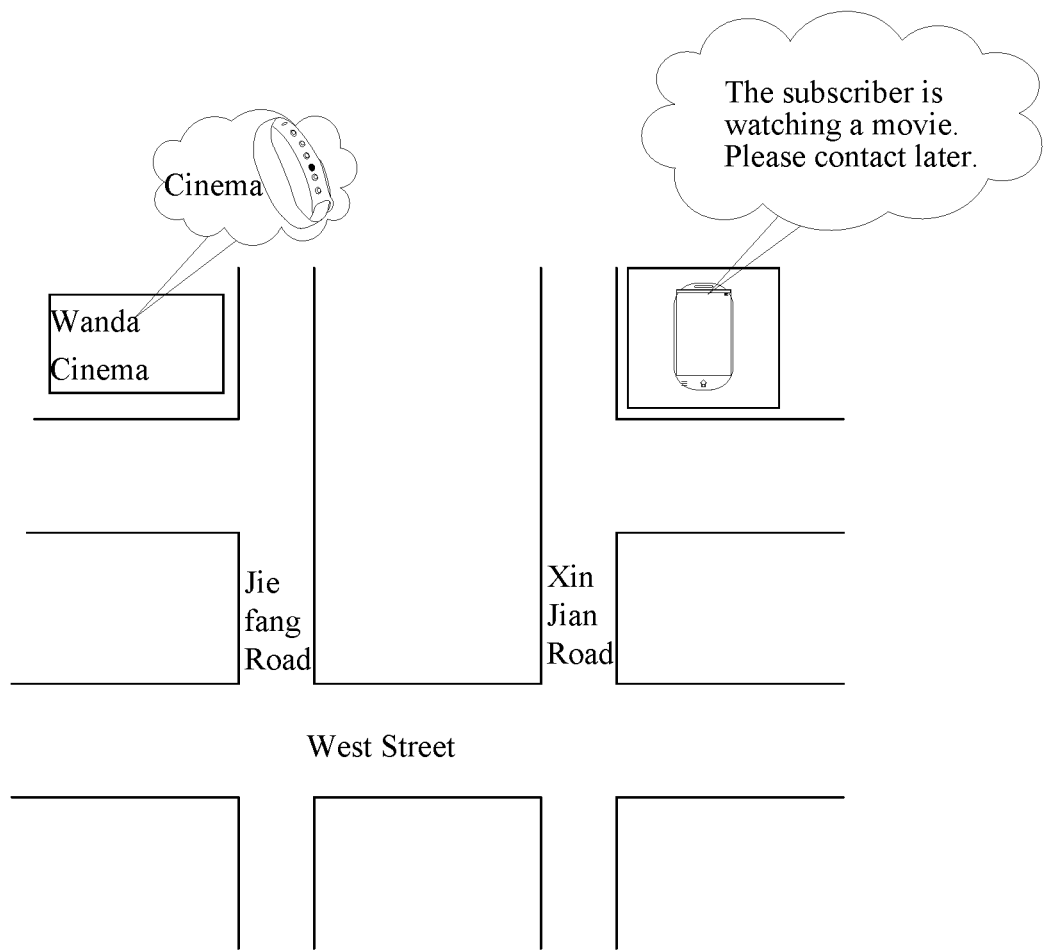
FIG. 3b is a schematic diagram illustrating an application scene according to an exemplary embodiment.
Figure 3C:
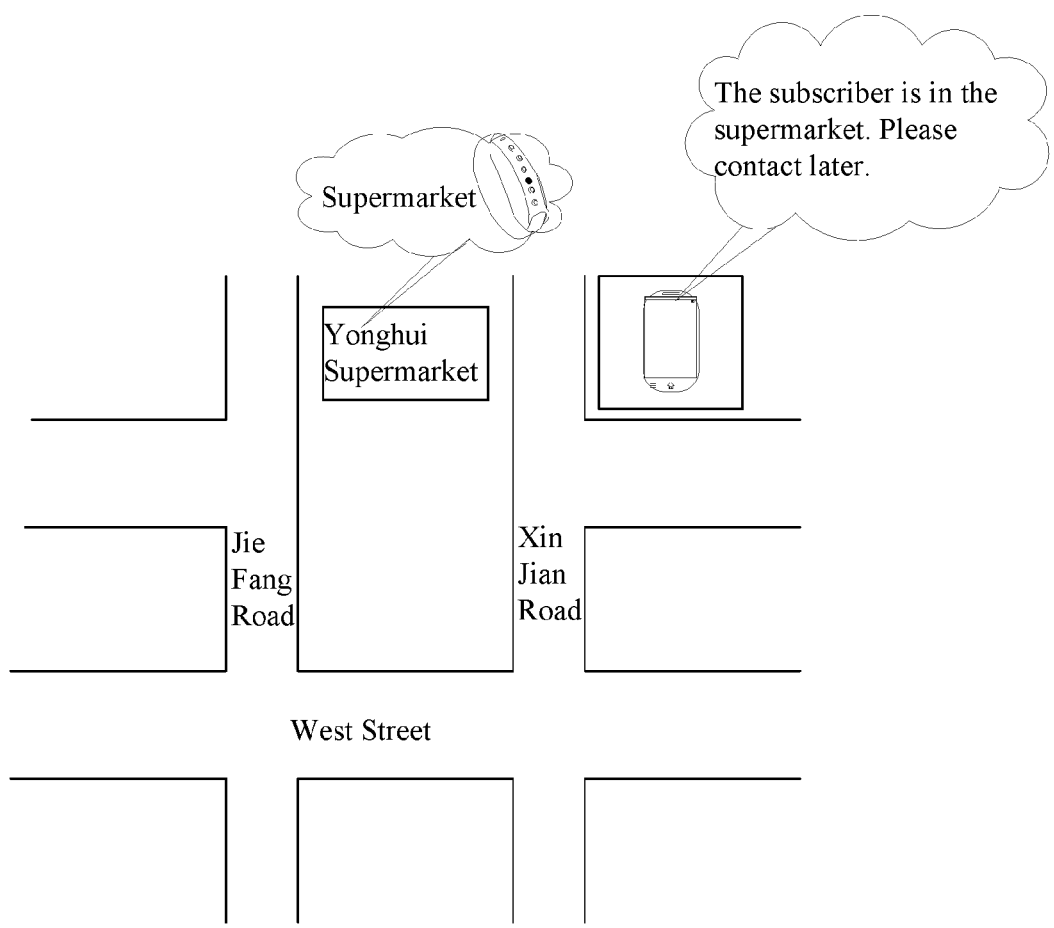
FIG. 3c is a schematic diagram illustrating an application scene according to an exemplary embodiment.
Figure 3D:
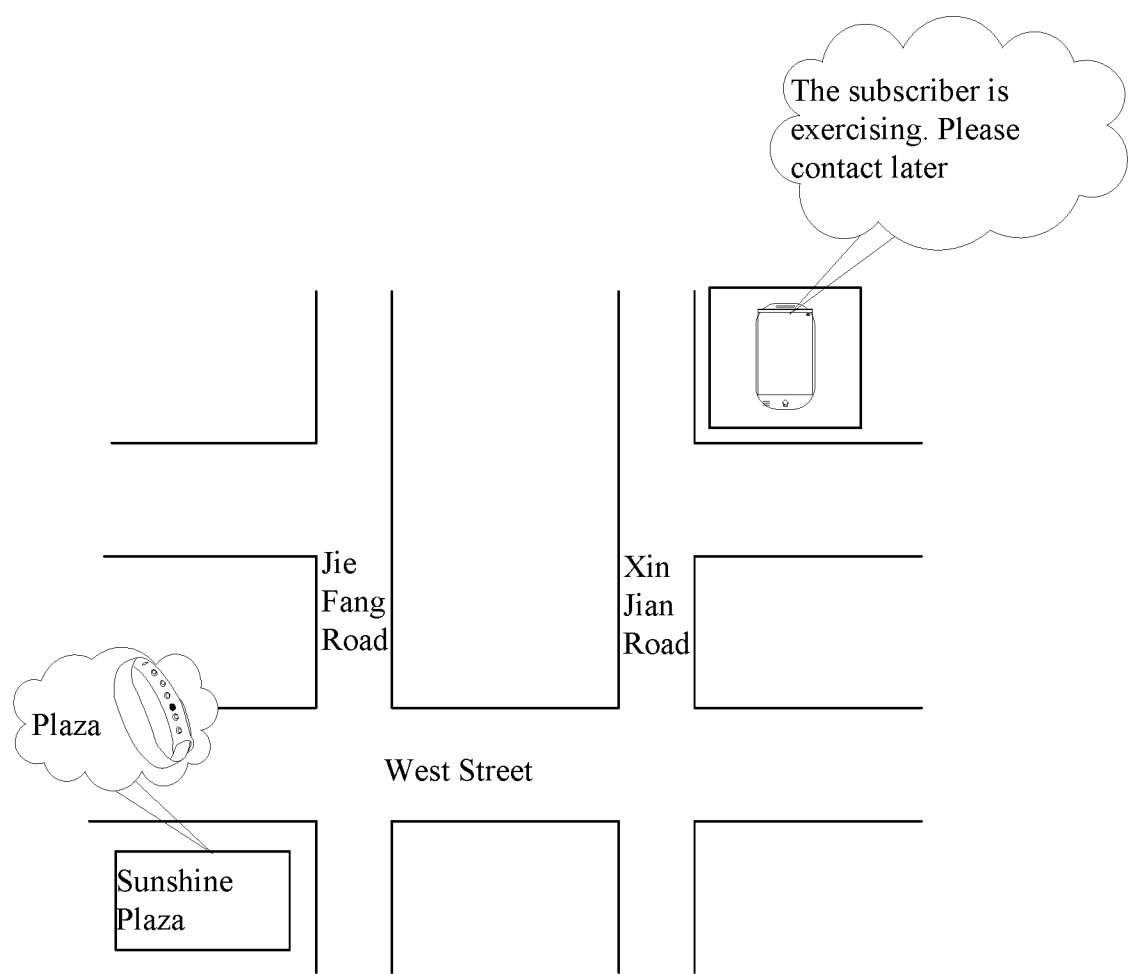
FIG. 3d is a schematic diagram illustrating an application scene according to an exemplary embodiment.

For example, as shown in FIG. 3a, when "Zhongguan Building" as a position name of the wearable device is acquired, the terminal can control the communication application program to send a reply message "The subscriber is at work and has forgotten to carry the mobile phone. Please contact later" to the sender of the communication message. As shown in FIG. 3b, when "Wanda Cinema" as a position name of the wearable device is acquired, the terminal can control the communication application program to send a reply message "The subscriber is watching a movie. Please contact later" to the sender of the communication message. As shown in FIG. 3c, when "Yonghui Supermarket" as a position name of the wearable device is acquired, the terminal can control the communication application program to send a reply message "The subscriber is in the supermarket. Please contact later" to the sender of the communication message. As shown in FIG. 3d, when "Sunshine Plaza" as a position name of the wearable device is acquired, the terminal can control the first application program to send a reply message "The subscriber is exercising. Please contact later" to the sender of the communication message.

In some embodiments, after the terminal acquires a current position name of the wearable device, if the position name cannot be found from the position-message corresponding table, a position nearest to the current position, also referred to herein as a "nearest position," can be acquired from the position-message corresponding table. Then it is determined whether a distance between the current position and the nearest position, also referred to herein as a "position distance," is smaller than a threshold distance, such as 100 meters. If the position distance is smaller than the threshold distance, a reply message corresponding to the nearest position is acquired, and the communication application program is controlled to send the reply message to the sender of the communication message. If the position distance is larger than the threshold distance, a default reply message, such as "The subscriber has forgotten to carry the mobile phone. Please contact later," can be acquired, and then the communication application program is controlled to send the default reply message to the sender of the communication message.

As described above, the user can manually add position information and corresponding reply messages into the position-message corresponding table. In some embodiments, position information and corresponding reply messages can also be determined according to a statistic of the user's historical position information, and automatically added to the position-message corresponding relation. This can be done by determining a usage scene corresponding to certain position information according to the historical position information of the wearable device within a preset historical duration, determining a reply message corresponding to the certain position information according to the usage scene corresponding to the certain position information, and adding the certain position information and the corresponding reply message to the position-message corresponding relation.

For example, the preset historical duration can be one year, one month, or the like. A corresponding relation between usage scenes and reply messages can be pre-stored in the management application program, and the usage scene can be set as working, running, supermarket shopping, or the like. The management application program can also provide a calendar to the user to define the time periods corresponding to the usage scenes, such as a working period, a running period, a supermarket shopping period, and the like. For example, the user can set the working period to be from 8:00 to 18:00 Monday to Friday, the running period to be from 20:00 to 21:00 every day, the supermarket shopping period to be from 8:00 to 10:00 every Sunday, and so on. For one time period, the terminal can acquire position information of the wearable device within that time period and determine a number of appearance times that each item of position information appears during that time period in the historical duration. For each item of position information appearing during that time period in the historical duration, the terminal determines an appearance ratio, i.e., a ratio of the number of appearance times of that item of position information to the total number of appearance times of all position information. The terminal then sets the item of position information having an appearance ratio larger than a preset ratio threshold, e.g., 60%, as the position information of the usage scene corresponding to that time period. A reply message corresponding to that position information can be determined according to the corresponding relation between usage scenes and reply messages, and then the position information and the determined reply message are added to the position-message corresponding relation.

In the exemplary methods described above, reply messages are sent according to position information of the wearable device. In some embodiments, a reply message can be sent according to a pre-stored corresponding relation between times and reply messages. Such a corresponding relation is also referred to as a "time-message corresponding relation." Thus, when the communication application program receives a communication message while the terminal is in the auto-reply mode, a reply message corresponding to a current time is determined according to the pre-stored time-message corresponding relation, and the communication application program is controlled to send the determined reply message to the sender of the commutation message.

In some embodiments, a table of time-message corresponding relation, such as Table 2, can be pre-stored in the management application program. Such a table is also referred to herein as a "time-message corresponding table." The time-message corresponding table can include reply messages corresponding to different time periods and can be edited by the user. For example, as shown in Table 2, the user can add a reply message "The subscriber is at work and has forgotten to carry the mobile phone. Please contact later" corresponding to a time period between 9:00 to 18:00 from Monday to Friday, a reply message "The subscriber is running and has forgotten to carry the mobile phone. Please contact later" corresponding to a time period from 20:00 to 21:00 every day, a reply message "The subscriber is sleeping" corresponding to a time period from 22:00 to next 7:00, and the like, into the time-message corresponding table.

TABLE 2

| Time period | 9:00-18:00 | 20:00-21:00 | 22:00-7:00 | ... |
|---|---|---|---|---|
| Reply message | The subscriber is at work and has forgotten to carry the mobile phone. Please contact later. | The subscriber is running and has forgotten to carry the mobile phone. Please contact later. | The subscriber is sleeping. | ... |

Thus, if the profile of the terminal is the auto-reply mode, when the terminal detects that the communication application program receives a communication message, the terminal can acquire a communication message receiving time, identify a time period including the communication message receiving time in the time-message corresponding table, and acquire a reply message corresponding to the identified time period from the time-message corresponding table. Then, the terminal can control the communication application program to send the acquired reply message to the sender of the communication message through a pre-stored interface provided by the communication application program.

Figure 4A:
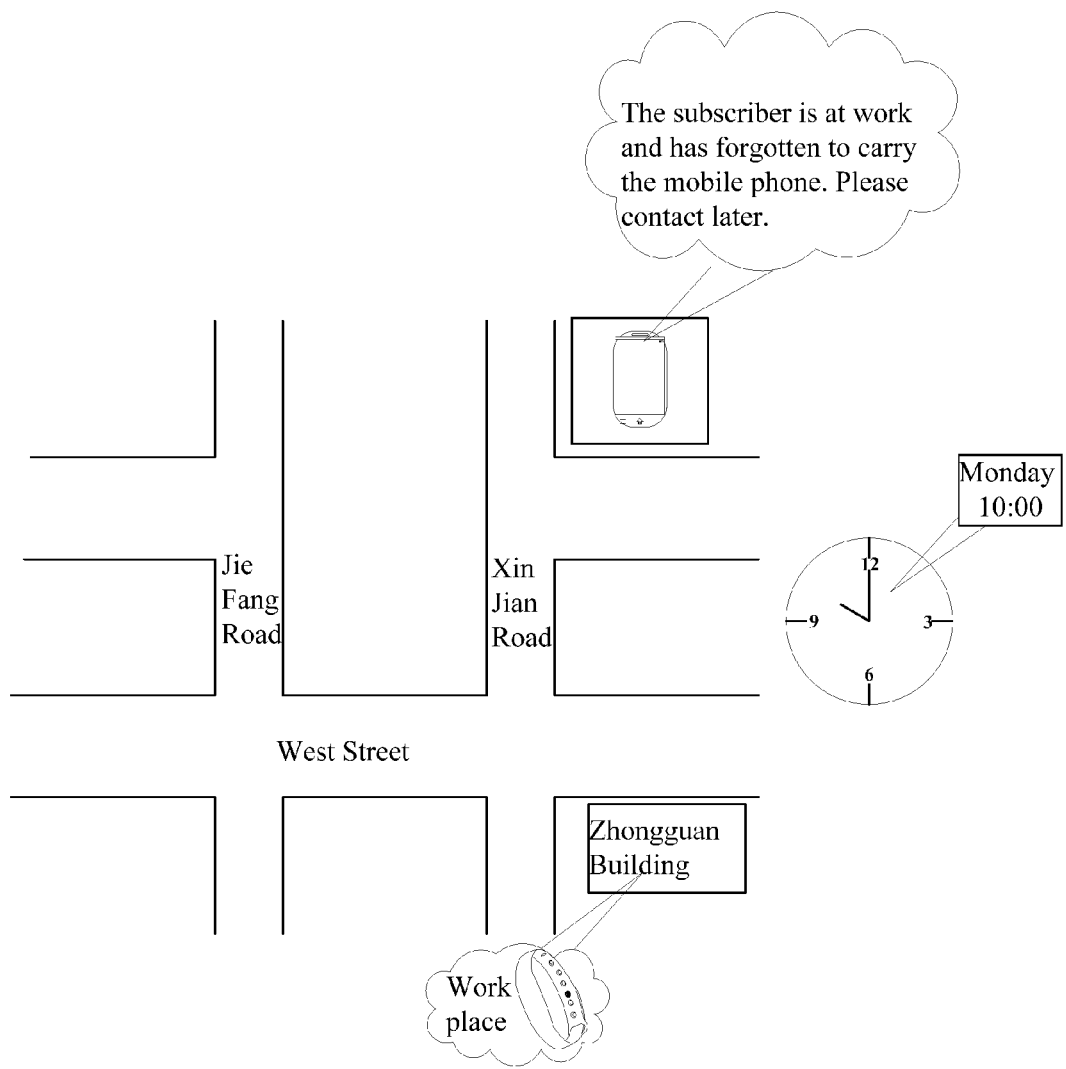
FIG. 4a is a schematic diagram illustrating an application scene according to an exemplary embodiment.
Figure 4B:
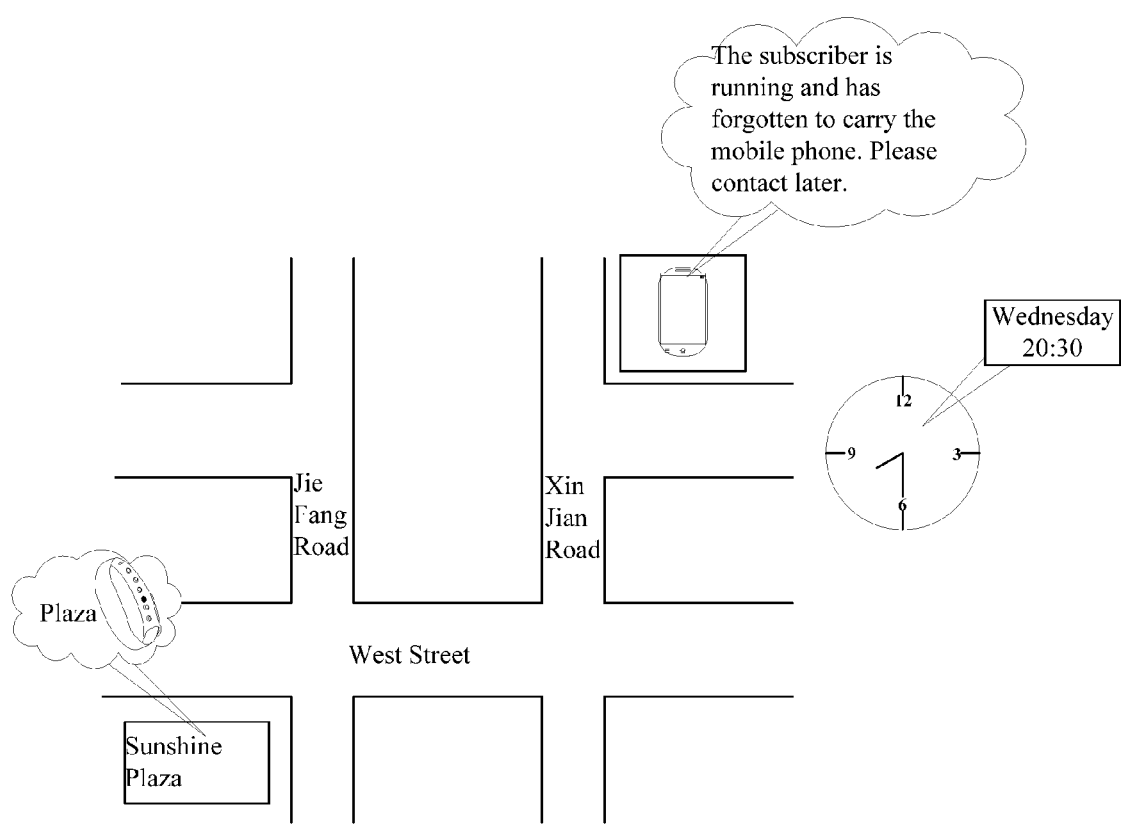
FIG. 4b is a schematic diagram illustrating an application scene according to an exemplary embodiment.
Figure 4C:
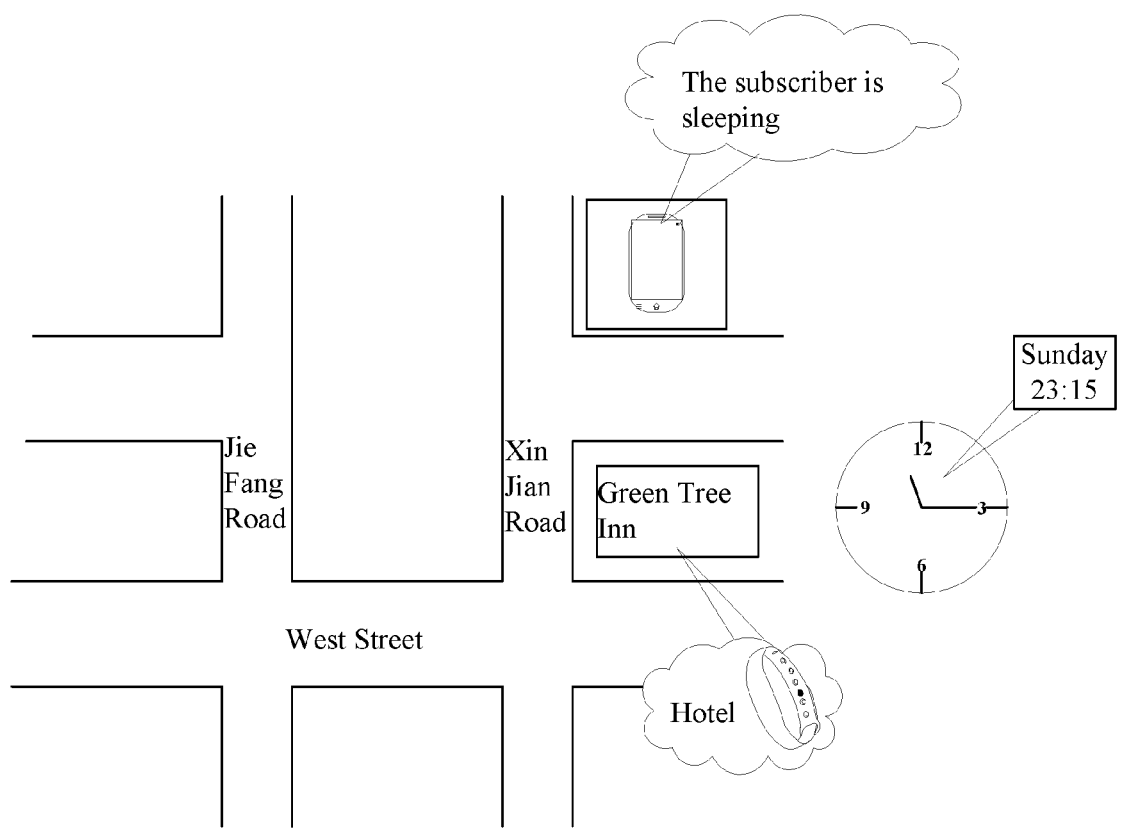
FIG. 4c is a schematic diagram illustrating an application scene according to an exemplary embodiment.

For example, as shown in FIG. 4a, if a communication message receiving time acquired by the terminal is 10:00 am, the communication application program is controlled to send "The subscriber is at work and has forgotten to carry the mobile phone, Please contact later" to the sender of the communication message. As shown in FIG. 4b, if a communication message receiving time acquired by the terminal is 20:30, the communication application program is controlled to send "The subscriber is running and has forgotten to carry the mobile phone. Please contact later" to the sender of the communication message. As shown in FIG. 4c, if a communication message receiving time acquired by the terminal is 23:15, the communication application program is controlled to send "The subscriber is sleeping" to the sender of the communication message.

In some embodiments, a reply message can be sent automatically according to a calendar stored in the terminal. That is, when the communication application program receives a communication message while the terminal is in the auto-reply mode, current event information corresponding to a current time is determined according to the calendar stored in the terminal, a reply message corresponding to the current event information is determined according to a pre-stored corresponding relation between event information and reply messages, and the communication application program is controlled to send the determined reply message to the sender of the communication message. The corresponding relation between event information and reply messages is also referred to herein as an "event-message corresponding relation."

In some embodiments, the user can set daily event information, including the event's subject, time, and location, in the calendar. Table 3 is an exemplary table of event-message corresponding relation, which can be set in the management application program. Such a table is also referred to herein as an "event-message corresponding table." The event-message corresponding table can include reply messages corresponding to different events, which can be edited by the user. For example, a reply message corresponding to event information of "At meeting" is "The subscriber is at meeting. Please contact later," a reply message corresponding to event information of "Watching a movie" is "The subscriber is watching a movie. Please contact later," and so on.

TABLE 3

| | Event information | | |
|---|---|---|---|
| | At Meeting | In Market | Watching a movie ... |
| Reply message | The subscriber is at meeting. Please contact later. | The subscriber is shopping. Please contact later. | The subscriber is watching a movie. Please contact later. ... |

If the profile of the terminal is the auto-reply mode, when the terminal detects that the communication application program receives a communication message, the terminal can acquire a calendar of the user and a current time, identify event information corresponding to the current time from the calendar, determine a reply message corresponding to the current event information from the event-message corresponding table, and then control the communication application program to send the determined reply message to the sender of the communication message through a pre-stored interface provided by the communication application program.

In some embodiments, after the calendar and the current time are acquired, if the calendar does not have event information corresponding to the current time, or the event information corresponding to the current time is not in the event-message corresponding table, a default reply message, such as "The subscriber has forgotten to carry the mobile phone. Please contact later" can be acquired.

In some embodiments, when the user is in a sleep state, the terminal can also switch a current profile to the auto-reply mode. In some embodiments, the user is determined to be in the sleep state when sleep state information of the user sent by the wearable device is received. In some embodiments, the wearable device can use a gravity sensor to detect the user's sleep state. For example, when the wearable device detects that the user has not moved for 15 minutes, the wearable device sends user's sleep state information to the terminal. After the terminal receives the user's sleep state information sent by the wearable device, the management application program determines that the user is in the sleep state according to the user's sleep state information, and switches the local profile to the auto-reply mode.

Figure 5:
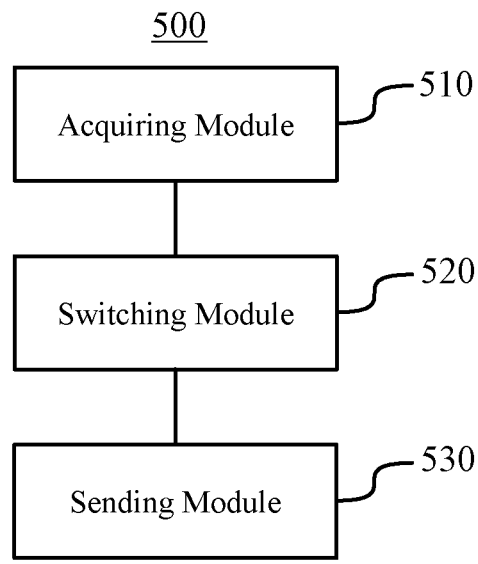
FIG. 5 is a structure diagram of a communication message processing device according to an exemplary embodiment.

FIG. 5 is a block diagram showing a communication message processing device 500 according to an exemplary embodiment. As shown in FIG. 5, the device 500 includes an acquiring module 510 configured to acquire a terminal distance between a terminal and a bound wearable device, a switching module 520 configured to switch the terminal to an auto-reply mode when the terminal distance exceeds a preset distance threshold, and a sending module 530 configured to control a communication application program to send a preset reply message to a sender of a communication message when the communication application program receives the communication message while the terminal is in the auto-reply mode.

In some embodiments, the switching module 520 is further configured to switch the terminal to the auto-reply mode when a duration, during which the terminal distance continuously exceeds the preset distance threshold, reaches a preset duration threshold.

Figure 6:
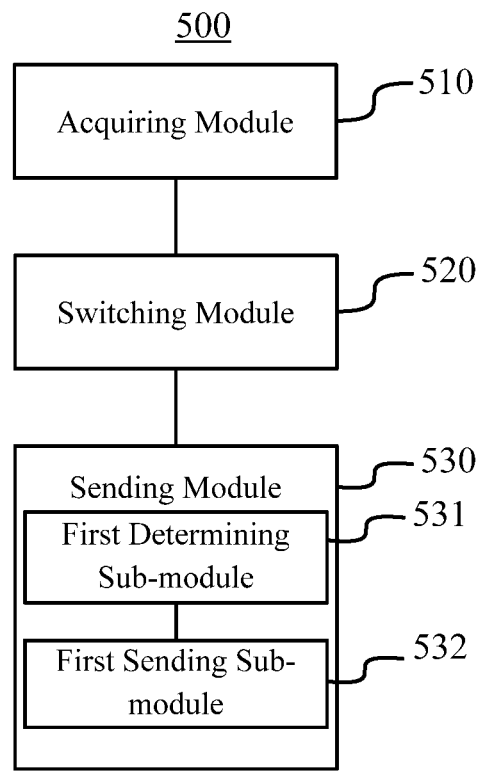
FIG. 6 is a structure diagram of a communication message processing device according to an exemplary embodiment.

In some embodiments, as show in FIG. 6, the sending module 530 includes a first determining sub-module 531 and a first sending sub-module 532. The first determining sub-module 531 is configured to determine a reply message corresponding to current position information of the wearable device according to a pre-stored position-message corresponding relation when the communication application program receives the communication message while the terminal is in the auto-reply mode. The first sending sub-module 532 is configured to control the communication application program to send the reply message to the sender of the communication message.

Figure 7:
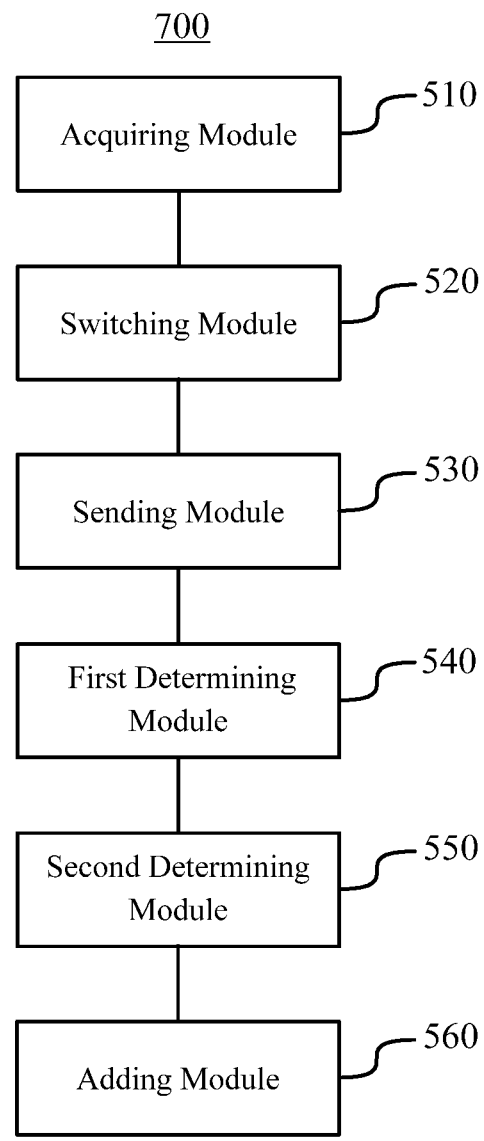
FIG. 7 is a structure diagram of a communication message processing device according to an exemplary embodiment.

FIG. 7 is a block diagram showing a communication message processing device 700 according to another exemplary embodiment. As show in FIG. 7, the device 700 includes the acquiring module 510, the switching module 520, the sending module 530, a first determining module 540, a second determining module 550, and an adding module 560. The first determining module 540 is configured to determine a usage scene corresponding to certain position information according to position information of the wearable device within a preset historical duration. The second determining module 550 is configured to determine a reply message corresponding to the certain position information according to the usage scene corresponding to the certain position information. The adding module 560 is configured to add the certain position information and the determined reply message to the position-message corresponding relation.

Figure 8:
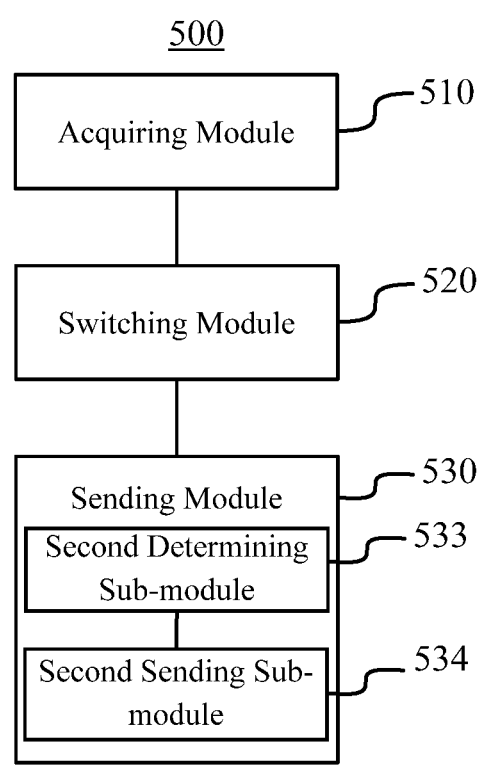
FIG. 8 is a structure diagram of a communication message processing device according to an exemplary embodiment.

In some embodiments, as show in FIG. 8, the sending module 530 includes a second determining sub-module 533 and a second sending sub-module 534. The second determining sub-module 533 is configured to determine a reply message corresponding to a current time according to a pre-stored time-message corresponding relation when the communication application program receives a communication message while the terminal is in the auto-reply mode. The second sending sub-module 534 is configured to control the communication application program to send the reply message to the sender of the communication message.

Figure 9:
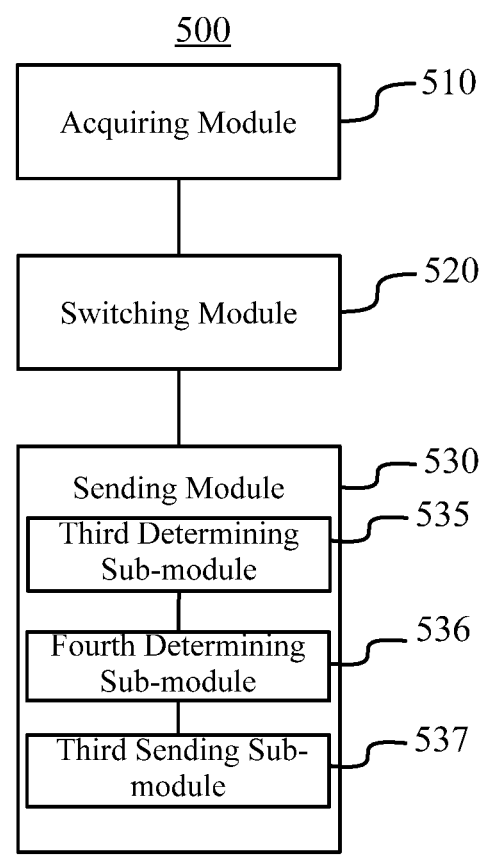
FIG. 9 is a structure diagram of a communication message processing device according to an exemplary embodiment.

In some embodiments, as show in FIG. 9, the sending module 530 includes a third determining sub-module 535, a fourth determining sub-module 536, and a third sending sub-module 537. The third determining sub-module 535 is configured to determine current event information of a user according to a calendar stored in the terminal when the communication application program receives a communication message while the terminal is in the auto-reply mode. The fourth determining sub-module 536 is configured to determine a reply message corresponding to the current event information according to a pre-stored event-message corresponding relation. The third sending sub-module 537 is configured to control the communication application program to send the reply message to the sender of the communication message.

In some embodiments, the switching module 520 is further configured to switch the terminal to the auto-reply mode when a message, which is sent by the wearable device and indicates the user is in a sleep state, is received.

The above-described exemplary devices are merely illustrated by example of divided functional modules. In some embodiments, the above functions can be assigned to different modules as desired, i.e., the internal structure of an exemplary device can be divided into different functional modules, so as to realize all or part of the functions described above. Operations of the exemplary devices are similar to the exemplary methods described above, and thus detailed description thereof is omitted here.

Figure 10:
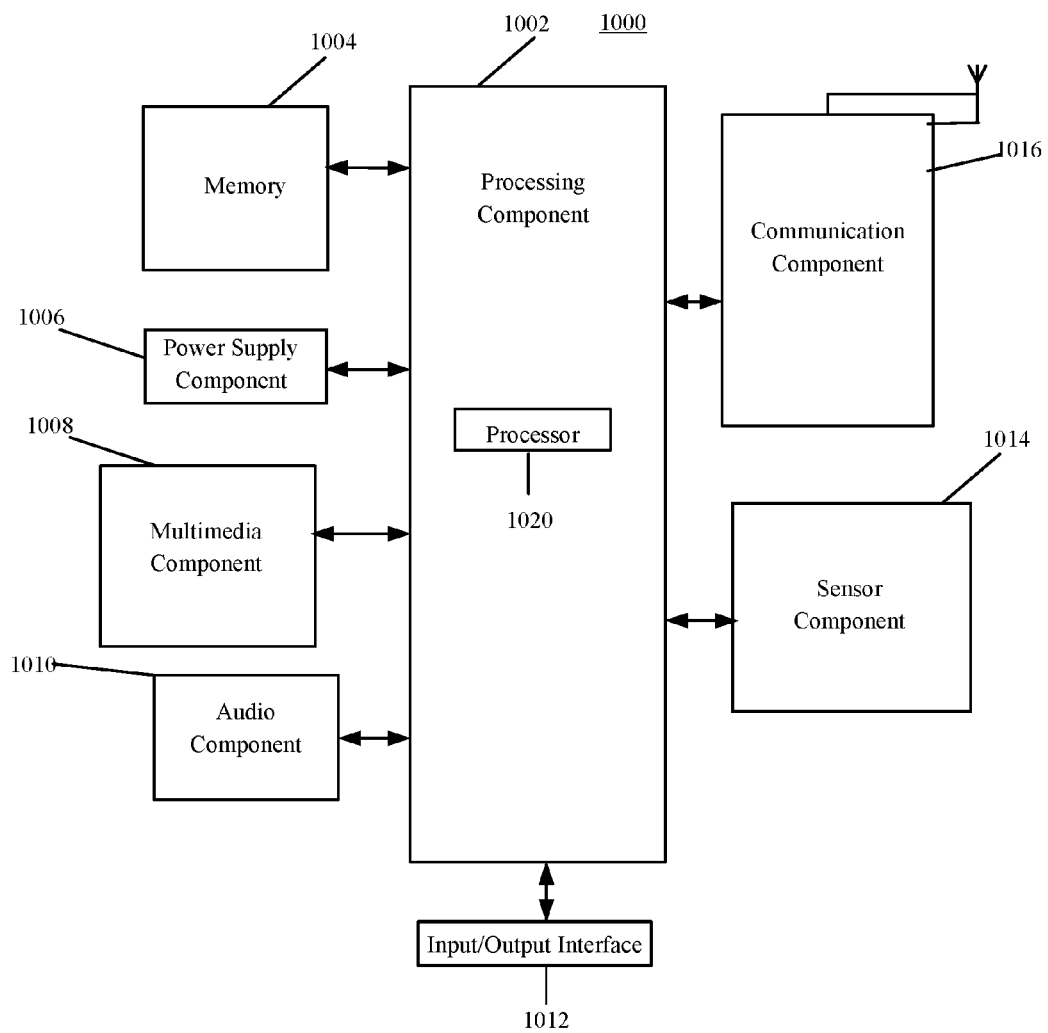
FIG. 10 is a structure diagram of a terminal according to an exemplary embodiment.

FIG. 10 is a structure diagram of a terminal 1000 according to an exemplary embodiment. The terminal 1000 may be a mobile phone, a tablet computer, or the like. Referring to FIG. 10, the terminal 1000 includes one or more of the following components: a processing component 1002, a memory 1004, a power supply component 1006, a multimedia component 1008, an audio component 1010, an input/output (I/O) interface 1012, a sensor component 1014, and a communication component 1016.

The processing component 1002 typically controls overall operations of the terminal 1000, such as the operations associated with display, telephone calls, data communications, camera operations, and recording operations. The processing component 1002 may include one or more processors 1020 to execute instructions to perform all or part of a method consistent with the present disclosure, such as one of the above-described exemplary methods. Moreover, the processing component 1002 may include one or more modules which facilitate the interaction between the processing component 1002 and other components. For example, the processing component 1002 may include a multimedia module to facilitate the interaction between the multimedia component 1008 and the processing component 1002.

The memory 1004 is configured to store various types of data to support the operation of the terminal 1000. Examples of such data include instructions for any applications or methods operated on the terminal 1000, contact data, phonebook data, messages, pictures, video, etc. The memory 1004 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1006 provides power to various components of the terminal 1000. The power supply component 1006 may include a power supply management system, one or more power sources, and any other components associated with the generation, management, and distribution of power in the terminal 1000.

The multimedia component 1008 includes a screen providing an output interface between the terminal 1000 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1008 includes a front camera and/or a rear camera. The front camera and/or the rear camera may receive an external multimedia datum while the terminal 1000 is in an operation mode, such as a photographing mode or a video mode. Each of the front and rear cameras may be a fixed optical lens system or have a focus and optical zoom capability.

The audio component 1010 is configured to output and/or input audio signals. For example, the audio component 1010 includes a microphone configured to receive an external audio signal when the terminal 1000 is in an operation mode, such as a call mode, a recording mode, and a voice recognition mode. The received audio signal may be further stored in the memory 1004 or transmitted via the communication component 1016.

The I/O interface 1012 provides an interface between the processing component 1002 and peripheral interface modules, such as a keyboard, a click wheel, buttons, and the like. The buttons may include, but are not limited to, a home button, a volume button, a starting button, and a locking button.

The sensor component 1014 includes one or more sensors to provide status assessments of various aspects of the terminal 1000. For instance, the sensor component 1014 may detect an open/closed status of the terminal 1000, relative positioning of components, e.g., the display and the keypad, of the terminal 1000, a change in position of the terminal 1000 or a component of the terminal 1000, a presence or absence of user's contact with the terminal 1000, an orientation or an acceleration/deceleration of the terminal 1000, and a change in temperature of the terminal 1000. The sensor component 1014 may include a proximity sensor configured to detect the presence of nearby objects without any physical contact. The sensor component 1014 may also include a light sensor, such as a CMOS or CCD image sensor, for use in imaging applications. In some embodiments, the sensor component 1014 may also include an accelerometer sensor, a gyroscope sensor, a magnetic sensor, a pressure sensor or a temperature sensor.

The communication component 1016 is configured to facilitate communication, wired or wirelessly, between the terminal 1000 and other devices. The terminal 1000 can access a wireless network based on a communication standard, such as WiFi, 2G, 3G, or 4G or a combination thereof. In one exemplary embodiment, the communication component 1016 receives a broadcast signal or broadcast associated information from an external broadcast management system via a broadcast channel. In one exemplary embodiment, the communication component 1016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth technology, and other technologies.

In exemplary embodiments, the terminal 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing a method consistent with the present disclosure, such as one of the above described exemplary methods.

According to the present disclosure, there is also provided a non-transitory computer-readable storage medium storing instructions, such as in the memory 1004, executable by the processor 1020 in the terminal 1000, for performing a method consistent with the present disclosure, such as the above-described exemplary methods. For example, the non-transitory computer-readable storage medium may be a ROM, a RAM, a CD-ROM, a magnetic tape, a floppy disc, an optical data storage device, or the like.

The terminal 1000 is configured to execute a method consistent with the present disclosure, such as one of the above-described exemplary methods.

According to the present disclosure, a terminal can timely reply to a received message, and therefore information can be timely acquired.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A communication message processing method, comprising:
    acquiring a terminal distance between a terminal and a wearable device;
    switching the terminal to an auto-reply mode when the terminal distance exceeds a preset distance threshold; and
    controlling, when a communication application program in the terminal receives a communication message, the communication application program to send an auto-reply message to a sender of the communication message,
    wherein controlling the communication application program to send the auto-reply message includes:
    determining the auto-reply message according to a current position of the wearable device and a pre-stored corresponding relation between positions and auto-reply messages.

2. The method of claim 1, wherein switching the terminal to the auto-reply mode includes:

switching the terminal to the auto-reply mode when a duration, during which the terminal distance exceeds the preset distance threshold, reaches a preset duration threshold.

3. The method of claim 1, further comprising:

determining a scene position of a usage scene according to historical positions of the wearable device within a preset historical duration;

determining a candidate auto-reply message corresponding to the scene position according to a pre-stored corresponding relation between usage scenes and auto-reply messages; and adding the scene position and the candidate auto-reply message to the corresponding relation between positions and reply messages.

4. The method of claim 1, wherein controlling the communication application program to send the auto-reply message includes:

determining the auto-reply message according to a current time and a pre-stored corresponding relation between times and auto-reply messages.

5. The method of claim 1, wherein controlling the communication application program to send the auto-reply message includes:

determining current event information corresponding to a current time according to a calendar stored in the terminal; and determining the auto-reply message according to the current event information and a pre-stored corresponding relation between event information and auto-reply messages.

6. The method of claim 1, further comprising:

switching the terminal to the auto-reply mode when a sleep-indication message is received, the sleep-indication message being sent by the wearable device and indicating that a user of the wearable device is in a sleep state.

7. A terminal, comprising:

a processor; and a memory storing instructions that, when executed by the processor, cause the processor to:

acquire a terminal distance between the terminal and a wearable device;

switch the terminal to an auto-reply mode when the terminal distance exceeds a preset distance threshold; and control, when a communication application program in the terminal receives a communication message, the communication application program to send an auto-reply message to a sender of the communication message, wherein, in controlling the communication application program to send the auto-reply message, the instructions further cause the processor to:

determine the auto-reply message according to a current position of the wearable device and a pre-stored corresponding relation between positions and auto-reply messages.

8. The terminal according to claim 7, wherein the instructions further cause the processor to:

switch the terminal to the auto-reply mode when a duration, during which the terminal distance exceeds the preset distance threshold, reaches a preset duration threshold.

9. The terminal according to claim 7, wherein the instructions further cause the processor to:

determine a scene position of a usage scene according to historical positions of the wearable device within a preset historical duration;

determine a candidate auto-reply message corresponding to the scene position according to a pre-stored corresponding relation between usage scenes and auto-reply messages; and add the scene position and the candidate auto-reply message to the corresponding relation between positions and reply messages.

10. The terminal according to claim 7, wherein the instructions further cause the processor to:

determine the auto-reply message according to a current time and a pre-stored corresponding relation between times and auto-reply messages.

11. The communication message processing device according to claim 7, wherein the instructions further cause the processor to:

determine current event information corresponding to a current time according to a calendar stored in the terminal; and determine the auto-reply message according to the current event information and a pre-stored corresponding relation between event information and auto-reply messages.

12. The communication message processing device according to claim 7, wherein the instructions further cause the processor to:

switch the terminal to the auto-reply mode when a sleep-indication message is received, the sleep-indication message being sent by the wearable device and indicating that a user of the wearable device is in a sleep state.

13. A non-transitory computer-readable storage medium having stored therein instructions that, when executed by a processor of a terminal, cause the terminal to:

acquire a terminal distance between the terminal and a wearable device;

switch the terminal to an auto-reply mode when the terminal distance exceeds a preset distance threshold; and control, when a communication application program in the terminal receives a communication message, the communication application program to send an auto-reply message to a sender of the communication message, wherein, in controlling the communication application program to send the auto-reply message, the instructions further cause the terminal to:

determine the auto-reply message according to a current position of the wearable device and a pre-stored corresponding relation between positions and auto-reply messages.

* * * * *